(12) United States Patent
Taguchi (10) Patent No.: US 11,808,614 B2
(45) Date of Patent: Nov. 7, 2023

(54) FIELD DEVICE

(71) Applicant: Yokogawa Electric Corporation, Tokyo (JP)

(72) Inventor: Masaya Taguchi, Musashino (JP)

(73) Assignee: YOKOGAWA ELECTRIC CORPORATION, Tokyo (JP)

( * ) Notice: Subject to any disclaimer, the term of this patent is extended or adjusted under 35 U.S.C. 154(b) by 100 days.

(21) Appl. No.: 17/506,147

(22) Filed: Oct. 20, 2021

(65) Prior Publication Data

US 2022/0136873 A1 May 5, 2022

(30) Foreign Application Priority Data

Oct. 29, 2020 (JP) ................. 2020-181674

(51) Int. Cl.
  *G01F 1/32* (2022.01)
  *G01F 1/325* (2022.01)
(52) U.S. Cl.
  CPC .......... *G01F 1/3209* (2013.01); *G01F 1/3287* (2022.01)
(58) Field of Classification Search
  CPC .......... G01F 1/32; G01F 1/3209; G01F 15/14; G01F 15/18
  See application file for complete search history.

(56) References Cited

U.S. PATENT DOCUMENTS

| 5,353,200 A | 10/1994 | Bodin et al. |
| 5,463,904 A * | 11/1995 | Kalinoski ............. G01F 1/3218 |
| | | 73/861.24 |
| 2006/0055006 A1 | 3/2006 | Orth et al. |
| 2016/0381822 A1 | 12/2016 | Hausler et al. |
| 2020/0105429 A1* | 4/2020 | Roberts ................ G01D 11/245 |
| 2020/0408581 A1* | 12/2020 | Scherrer .................... G01F 1/84 |

FOREIGN PATENT DOCUMENTS

| JP | 11-166843 A | 6/1999 |
| JP | 2002-107192 A | 4/2002 |
| WO | 2020/068423 A1 | 4/2020 |

* cited by examiner

*Primary Examiner* — Erika J. Villaluna
(74) *Attorney, Agent, or Firm* — Rankin, Hill & Clark LLP (57) ABSTRACT

A field device includes: a casing portion that has an amplifier shield chamber into which an analog signal transfer portion transferring an analog signal output from a detector is able to be inserted; a signal conversion portion that is disposed inside the amplifier shield chamber, the signal conversion portion being configured to convert the analog signal into a digital signal; and a first connector that is disposed inside the amplifier shield chamber, the first connector being configured to connect the analog signal transfer portion and the signal conversion portion to each other in an attachable/detachable manner.

19 Claims, 5 Drawing Sheets

FIELD DEVICE

BACKGROUND

Field of the Invention

The present invention relates to a field device.

Priority is claimed on Japanese Patent Application No. 2020-181674, filed on Oct. 29, 2020, the contents of which are incorporated herein by reference.

Description of Related Art

Regarding one of field devices, the vortex flowmeter described in Japanese Unexamined Patent Application Publication No. 2002-107192 is known. This vortex flowmeter includes a container having a tubular side wall and a partition wall provided at a central part of this side wall. The inside of this container is divided into a terminal box chamber and an amplifier chamber by the side wall and the partition wall. A terminal box portion having a signal terminal portion and a power supply terminal portion is provided in the terminal box chamber. An amplifier portion for processing an input signal and a power supply input is provided in the amplifier chamber.

Incidentally, in order to prevent the influence of noise such as power supply noise, an amplifier shield chamber is formed in an amplifier chamber. For example, a signal line for transferring an analog signal that is a detection result of a detection portion is accommodated in this amplifier shield chamber. In the related art, this signal line is screwed to a substrate disposed in an amplifier shield chamber. If a signal line is screwed to a substrate, there is a need to secure not only a space for disposing a screw but also a space for driving a screw in the amplifier shield chamber. For this reason, the amplifier shield chamber is increased size, and thus there have been limitations on a degree of freedom in external design of an amplifier shield chamber.

SUMMARY

A field device may include: a casing portion that has an amplifier shield chamber into which an analog signal transfer portion transferring an analog signal output from a detector is able to be inserted; a signal conversion portion that is disposed inside the amplifier shield chamber, the signal conversion portion being configured to convert the analog signal into a digital signal; and a first connector that is disposed inside the amplifier shield chamber, the first connector being configured to connect the analog signal transfer portion and the signal conversion portion to each other in an attachable/detachable manner.

According to the aspect of the present invention, it is possible to provide a field device in which an amplifier shield chamber can be reduced in size.

Further features and aspects of the present disclosure will become apparent from the following detailed description of exemplary embodiments with reference to the attached drawings.

DETAILED DESCRIPTION OF EMBODIMENTS

The embodiments of the present invention will be now described herein with reference to illustrative preferred embodiments. Those skilled in the art will recognize that many alternative preferred embodiments can be accomplished using the teaching of the present invention and that the present invention is not limited to the preferred embodiments illustrated herein for explanatory purposes.

An aspect of the present invention is to provide a field device in which an amplifier shield chamber can be reduced in size.

Hereinafter, a field device according to an embodiment of the present invention will be described in detail with reference to the drawings. First, the overview of the embodiment of the present invention will be described below. Subsequently, details of the embodiment of the present invention will be described.

[Overview]

The vortex flowmeter of Japanese Unexamined Patent Application Publication No. 2002-107192 described above is a measuring device measuring a flow speed or a flow rate by measuring a frequency of Karman vortices discharged from a vortex generator placed inside a pipeline. Methods of detecting a vortex frequency include a stress detection method, in which a stress detection element is disposed above or inside a vortex generator, alternate lifting forces acting on the vortex generator are detected, and a frequency of Karman vortices is measured. A sensor analog signal from the stress detection element is subjected to signal transfer from a detector to a converter through a sensor lead wire. An analog signal transferred to the converter is converted into a digital signal in an amplifier shield chamber. The amplifier shield chamber is shielded from external noise and power supply noise by a metal container and an amplifier shielding plate of the converter.

In the related art, alternate lifting forces acting on the vortex generator are detected by the stress detection element, and a detected sensor analog signal is led via the sensor lead wire directly subjected to screw connection to a substrate in the amplifier shield chamber. When shielding properties against external electrical noise are secured with this structure, an area for the amplifier shield chamber including a screw connection spot is increased, and thus there may be limitations on a degree of freedom in substrate design.

In addition, since the sensor lead wire is fixed to the substrate, the converter cannot be detached from a main body without accessing the inside of the converter and removing the sensor lead wire so that the direction of the converter cannot be changed, resulting in poor maintainability.

According to the embodiment of the present invention, in a field device, an amplifier shield chamber is reduced in size through connector-connection of a sensor lead wire inside a converter. In addition, according to the embodiment of the present invention, a converter can be detached or the direction of a converter can be changed without accessing the inside of the converter by providing a relay portion between a detector and the converter and performing connector-connection of a sensor lead wire outside the converter.

Embodiment

Figure 1:
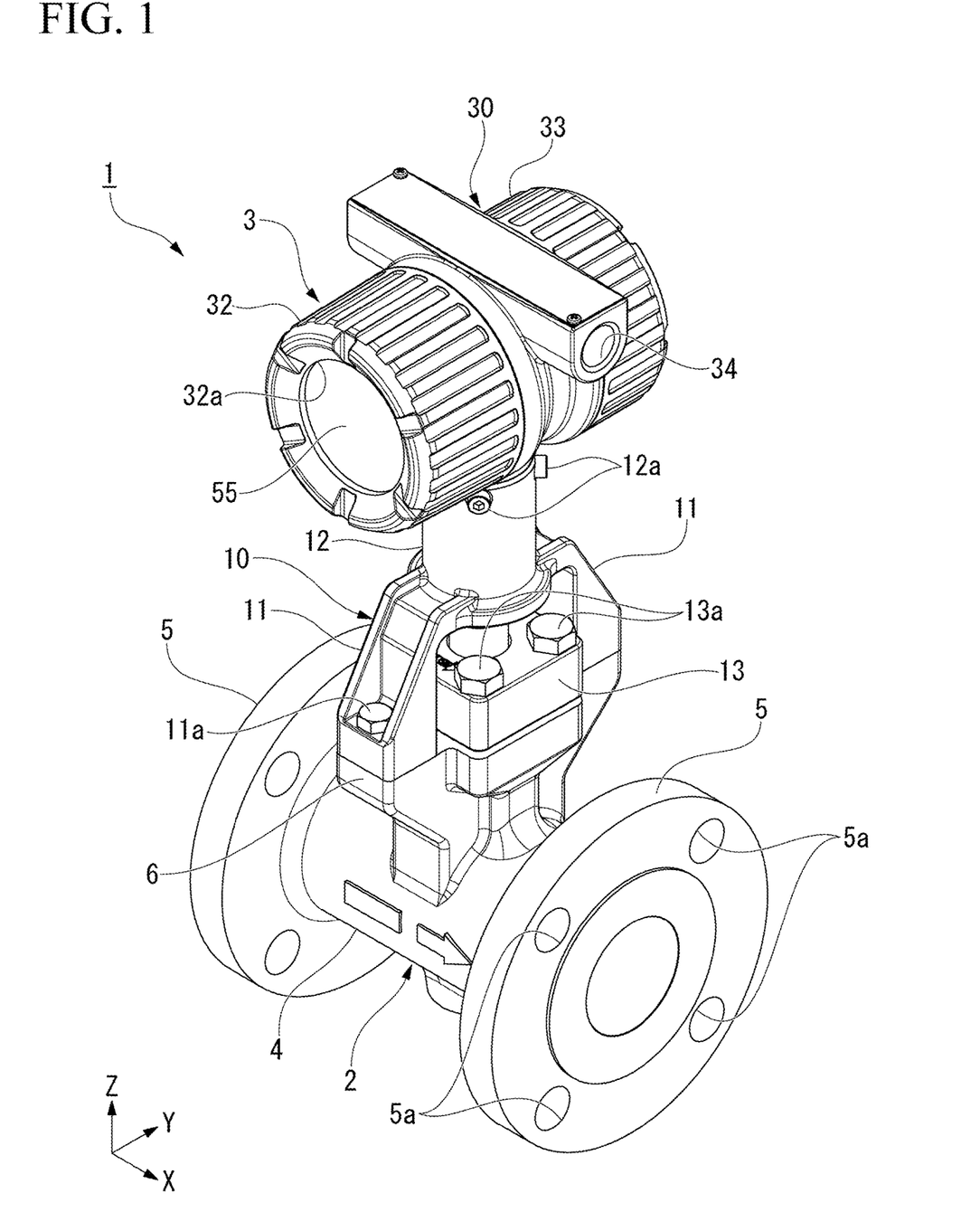
FIG. 1 is a perspective view illustrating a field device according to an embodiment.
Figure 2:
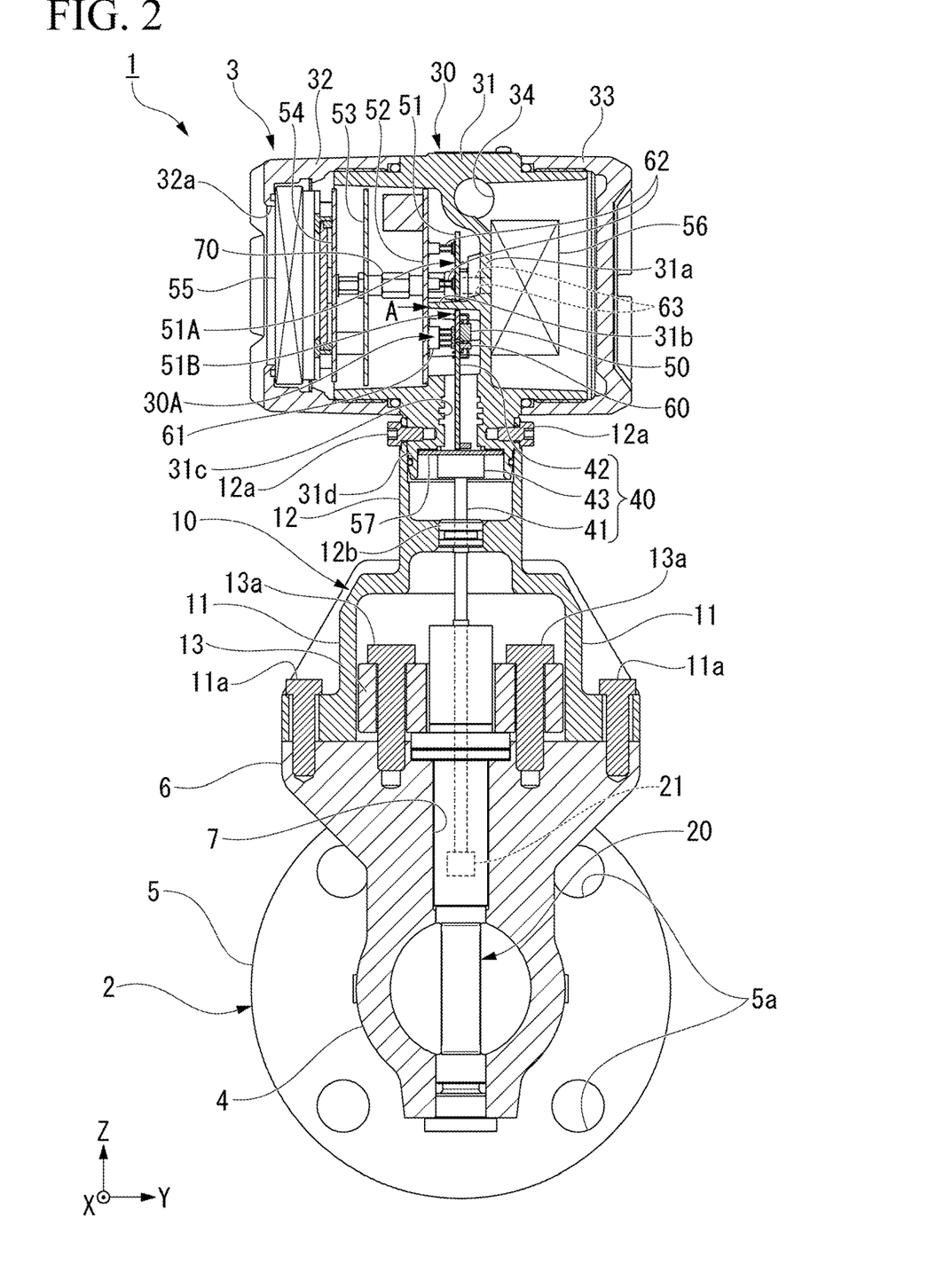
FIG. 2 is a cross-sectional view illustrating a constitution of the field device according to the embodiment.

FIG. 1 is a perspective view illustrating a field device 1 according to the embodiment. FIG. 2 is a cross-sectional view illustrating a constitution of the field device 1 according to the embodiment.

As illustrated in FIG. 1, the field device 1 includes a piping detector 2 (detector) and a converter 3. As illustrated in FIG. 2, the piping detector 2 includes a piping portion 4 and a detection portion 20.

In the following description, an XYZ orthogonal coordinate system is set, and a positional relationship between members may be described with reference to this XYZ orthogonal coordinate system. An X axis direction is a direction in which a fluid flows in the piping detector 2. A Z axis direction is a direction in which the converter 3 is connected to the piping detector 2 in a direction orthogonal to the foregoing X axis direction. A Y axis direction is a direction orthogonal to the foregoing X axis direction and the foregoing Z axis direction.

As illustrated in FIG. 1, the piping portion 4 is formed to have a cylindrical shape extending in the X axis direction. Flanges 5 which can be connected to external piping (not illustrated) are provided at both ends of the piping portion 4. A plurality of connection holes 5a are formed in the flanges 5 at intervals in a circumferential direction around a central axis of the piping portion 4. A pedestal portion 6 stands upright in the Z axis direction on a circumferential surface of the piping portion 4. A holder 10 supporting the converter 3 is connected to an upper surface of the pedestal portion 6.

As illustrated in FIG. 2, the detection portion 20 is formed to have a rod shape. The detection portion 20 extends in the Z axis direction from the upper surface of the pedestal portion 6 toward the piping portion 4 and is inserted into a penetration hole 7 penetrating the piping portion 4. A fixing block 13 for fixing the detection portion 20 is screwed to the upper surface of the pedestal portion 6 via a bolt 13a.

A stress detection element 21 is provided inside the detection portion 20. The stress detection element 21 detects alternate lifting forces acting on a vortex generator of the detection portion 20 disposed inside the piping portion 4, measures a frequency of Karman vortices, and measures a flow speed or a flow rate of a fluid from the frequency. The detection portion 20 may include sensors not only detecting a flow speed or a flow rate but also detecting various physical parameters such as a temperature, a humidity, a pressure, vibration, an acceleration, and a rotation frequency, for example.

A detection signal (analog signal) output from the detection portion 20 (stress detection element 21) is transferred to the converter 3 via an analog signal transfer portion 40. The holder 10 includes a pair of leg portions 11 straddling the fixing block 13 in the Y axis direction, and a support portion 12 supported by the pair of leg portions 11 and supporting the converter 3. The pair of leg portions 11 is screwed to the upper surface of the pedestal portion 6 via a bolt 11a.

The support portion 12 is formed to have a bottomed tubular shape opening in the Z axis direction. In the support portion 12, a mounting tube portion 31d provided in the converter 3 is inserted thereinto, and the mounting tube portion 31d is screwed thereto via a bolt 12a. A bottom portion of the support portion 12 is penetrated in the Z axis direction, and a holding component 12b for holding the analog signal transfer portion 40 is provided in the penetrating portion.

A communication hole 31c that communicates with an amplifier shield chamber 30A, into which the analog signal transfer portion 40 is inserted, is formed in the mounting tube portion 31d. A connection substrate portion 57, to which a second connector 43 (which will be described below) is connected in an attachable/detachable manner, is disposed in a lower end opening of the communication hole 31c. A holding component for holding the analog signal transfer portion 40 or a seal component for sealing the communication hole 31c may be provided in the communication hole 31c.

The converter 3 includes a casing portion 30 having the amplifier shield chamber 30A into which the analog signal transfer portion 40 is inserted. In the amplifier shield chamber 30A, a signal conversion portion 50 converting an analog signal into a digital signal and a connector 60 connecting the analog signal transfer portion 40 and the signal conversion portion 50 to each other in an attachable/detachable manner are disposed.

The casing portion 30 includes a tubular casing main body 31 extending in the Y axis direction, a first cover 32 mounted on one end side (negative Y side) of the casing main body 31, and a second cover 33 mounted on the other end side of the casing main body 31 (positive Y side). Inside the casing main body 31, a partition wall portion 31a is provided substantially at an intermediate position in the Y axis direction. In the casing portion 30, the casing main body 31 need only be made of a material which can block at least electrical noise, and it may be made of a metal, for example. The first cover 32 and the second cover 33 may be made of resin.

In the casing portion 30, a space on the left side (negative Y side) of the partition wall portion 31a serves as an amplifier chamber, in which a first substrate portion 51, a second substrate portion 52, a third substrate portion 53, a fourth substrate portion 54, and a display device 55 are disposed. A window portion 32a for exposing a display surface of the display device 55 is provided in the first cover 32. The display device 55 is a liquid crystal display, an organic EL display, or the like, which displays a flow speed, a flow rate, and the like of a fluid, for example.

In the casing portion 30, a space on the right side (positive Y side) of the partition wall portion 31a serves as a terminal box chamber, in which a terminal box 56 is disposed. External wiring (not illustrated) introduced through an external wiring introduction hole 34 formed in the casing main body 31 is connected to the terminal box 56. This external wiring includes a power supply line and a signal line. When the field device 1 is not operated by means of external electricity, a power supply or a radio communication device may be disposed in the terminal box chamber.

The signal conversion portion 50 is connected to the analog signal transfer portion 40 via the connector 60 and converts an analog signal into a digital signal. The signal conversion portion 50 may be provided in (an insertion portion 51B which will be described below) of the first substrate portion 51 or the second substrate portion 52 as long as it is inside the amplifier shield chamber 30A. In addition, the signal conversion portion 50 may not be packaged as a module. For example, it may be a signal conversion circuit provided in the first substrate portion 51 or the second substrate portion 52. Namely, any one of the first substrate portion 51 and the second substrate portion 52 may include the signal conversion portion 50.

The first substrate portion 51 has a main body portion 51A which is disposed inside the casing portion 30 and outside the amplifier shield chamber 30A, and the insertion portion 51B which is inserted into the amplifier shield chamber 30A via a communication hole 31b1 (refer to FIG. 3 which will be described below) of the amplifier shield chamber 30A extending from the main body portion 51A. The insertion portion 51B is connected to the analog signal transfer portion 40 via the connector 60 and connected to the second substrate portion 52 via a connector 61 inside the amplifier shield chamber 30A.

Outside the amplifier shield chamber 30A, the second substrate portion 52 is connected to the main body portion 51A of the first substrate portion 51 via a connector 62. In addition, the main body portion 51A is connected to the terminal box 56 via a connection terminal 63 penetrating the partition wall portion 31a. An analog signal transferred from the analog signal transfer portion 40 is converted into a digital signal in the amplifier shield chamber 30A and is transferred to the terminal box 56 via the second substrate portion 52, the connector 62, the main body portion 51A, and the connection terminal 63. Further, a digital signal transferred to the terminal box 56 is transferred to an external device, for example, via a signal line (not illustrated) connected to the terminal box 56.

Figure 3:
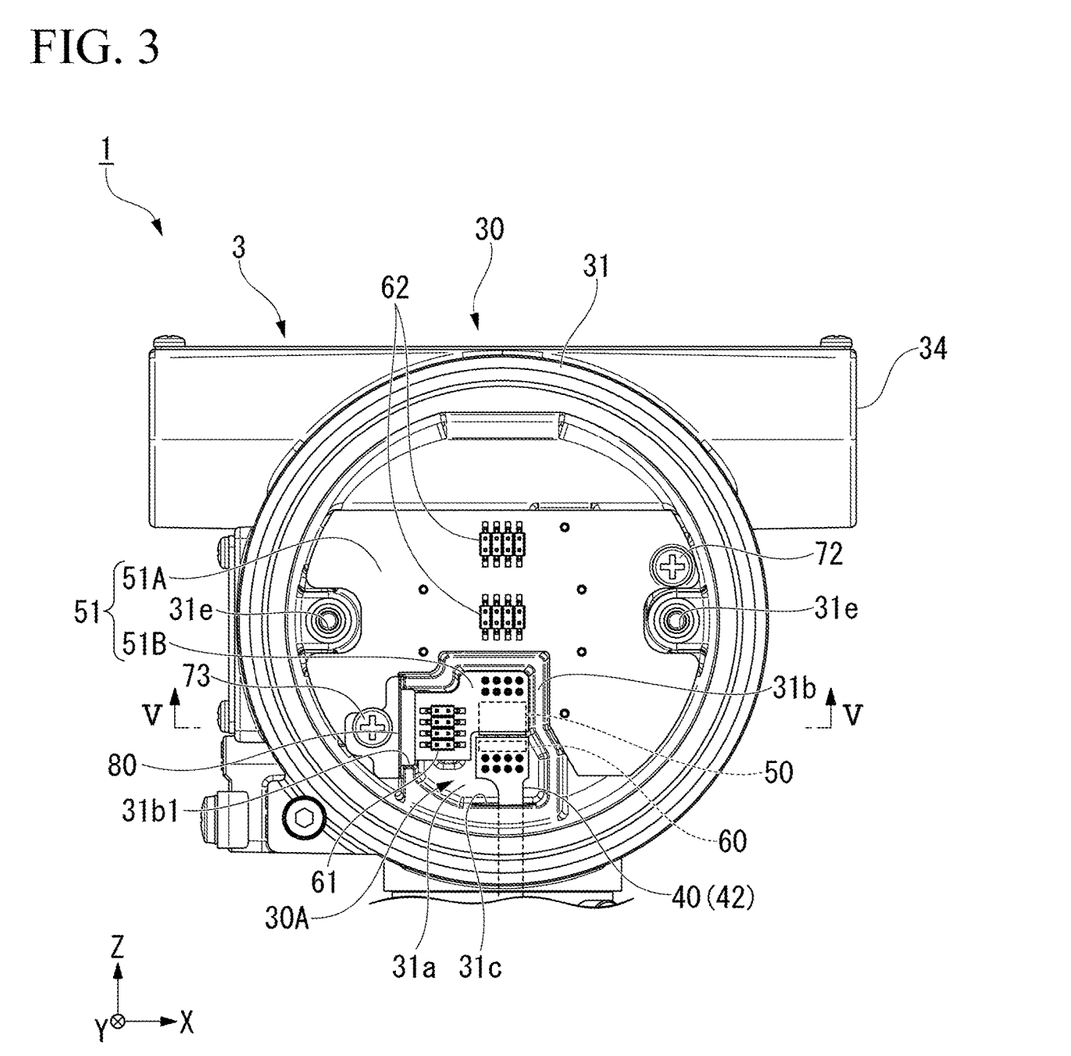
FIG. 3 is a view along the arrow A illustrated in FIG. 2.
Figure 4:
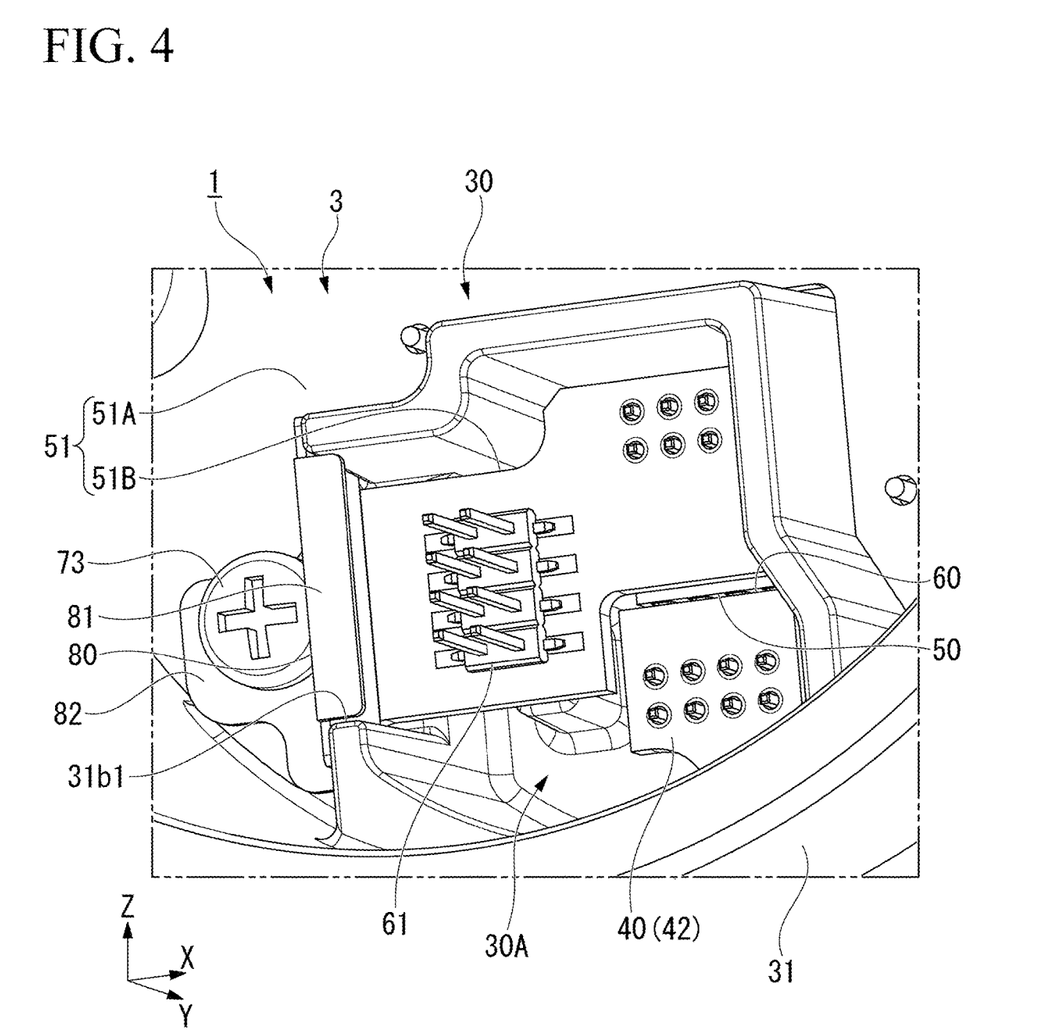
FIG. 4 is a perspective view illustrating an amplifier shield chamber in a state in which a second substrate portion according to the embodiment is removed.
Figure 5:
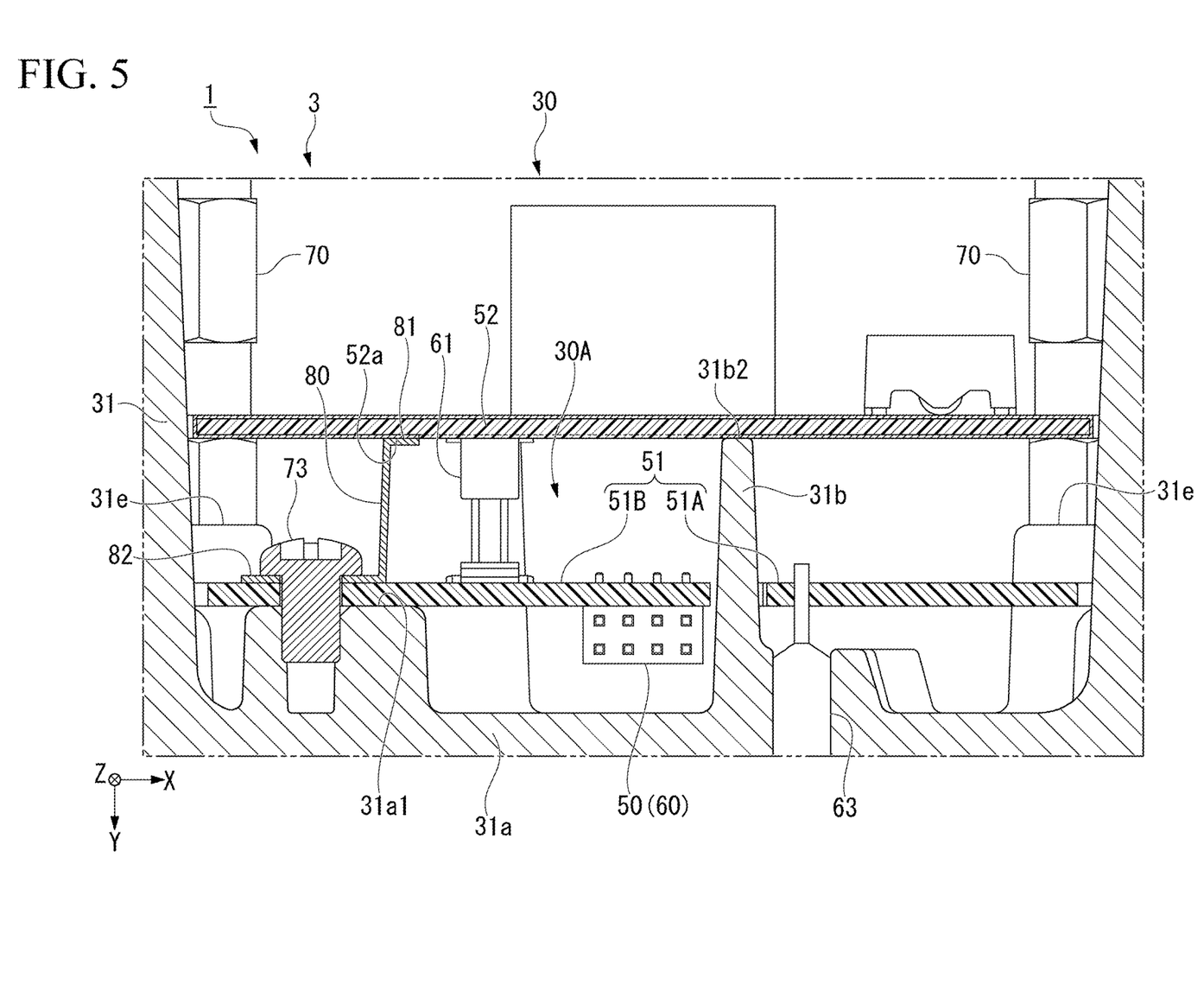
FIG. 5 is a cross-sectional view along V-V illustrated in FIG. 3.

FIG. 3 is a view along the arrow A illustrated in FIG. 2. FIG. 4 is a perspective view illustrating the amplifier shield chamber 30A in a state in which the second substrate portion 52 according to the embodiment is removed. FIG. 5 is a cross-sectional view along V-V illustrated in FIG. 3.

As illustrated in FIG. 5, the amplifier shield chamber 30A is formed by the partition wall portion 31a and a circumferential wall portion 31b provided in the casing main body 31, the second substrate portion 52, and an amplifier shielding plate 80.

The partition wall portion 31a faces a plate surface of the insertion portion 51B on one side (positive Y side). The circumferential wall portion 31b protrudes to the negative Y side from the partition wall portion 31a and surrounds a part around the insertion portion 51B as illustrated in FIG. 3, and the communication hole 31b1 is formed at a part thereof. The insertion portion 51B of the first substrate portion 51 passes through the communication hole 31b1 as described above. As illustrated in FIG. 4, the amplifier shielding plate 80 closes the communication hole 31b1 through which the insertion portion 51B of the first substrate portion 51 has passed. The amplifier shielding plate 80 need only be made of a material which can block electrical noise, and it is a metal plate, for example.

As illustrated in FIG. 5, the second substrate portion 52 is placed at an opening end edge of the circumferential wall portion 31b on a side opposite to the partition wall portion 31a and faces the plate surface of the insertion portion 51B on the other side (negative Y side). A shield pattern 52a is formed in the second substrate portion 52. The shield pattern 52a may be formed on an annular part, excluding the connector 61, in which at least an opening end of the circumferential wall portion 31b and a tip end portion 81 of the amplifier shielding plate 80 are in contact with each other. The shield pattern 52a illustrated in FIG. 5 is also formed on a surface of the second substrate portion 52 on the negative Y side and covers a region on the inward side of the foregoing annular part. However, a part covering a region on the inward side of the annular part may be formed inside (at an inner layer of) the second substrate portion 52.

The amplifier shielding plate 80 has the tip end portion 81 which is folded toward the inward side of the amplifier shield chamber 30A, and a fixing portion 82 which is folded toward the outward side of the amplifier shield chamber 30A. The tip end portion 81 abuts the shield pattern 52a of the second substrate portion 52, and the ground potential thereof falls to the same ground potential as that of the circumferential wall portion 31b (casing main body 31) abutting the shield pattern 52a in the same manner. In addition, since the tip end portion 81 has a function of blocking noise equivalent to that of the circumferential wall portion 31b, it has a length equivalent to the thickness of the circumferential wall portion 31b. The tip end portion 81 of the amplifier shielding plate 80 may be folded toward the outward side of the amplifier shield chamber 30A.

Outside the amplifier shield chamber 30A, the fixing portion 82 is screwed to the casing main body 31 together with the first substrate portion 51 via a bolt 73. A screw pedestal portion 31a1 for screwing the bolt 73 is formed in the partition wall portion 31a. As illustrated in FIG. 3, the first substrate portion 51 is screwed via the bolt 73 in the vicinity of the amplifier shield chamber 30A and is screwed to the casing main body 31 using a bolt 72 disposed substantially on a diagonal line with respect to the bolt 73. Namely, the first substrate portion 51 is screwed to the casing main body 31 using two bolts 72 and 73.

Second screw pedestal portions 31e, to which a support rod 70 supporting the third substrate portion 53 and the fourth substrate portion 54 illustrated in FIG. 2 is screwed, are formed in the vicinity of the bolt 73 of the casing main body 31. A pair of screw pedestal portions 31e are provided such that they are separated from each other in the X axis direction.

As illustrated in FIG. 2, the analog signal transfer portion 40 includes a first part 41 connected to the detection portion 20, a second part 42 inserted into the casing portion 30, and the second connector 43 connecting the first part 41 and the second part 42 to each other in an attachable/detachable manner outside the casing portion 30. For example, the first part 41 is a flexible sensor lead wire whose one end portion is connected to the stress detection element 21, and whose the other end portion is provided with the second connector 43 and connected to the connection substrate portion 57. The first part 41 is held by the holder 10 via the holding component 12b.

For example, the second part 42 is a circuit board whose one end portion is connected to the connection substrate portion 57, and whose another end portion is provided with the connector 60 and connected to the signal conversion portion 50. The second part 42 may be either a rigid substrate or a flexible substrate.

The second connector 43 is disposed in a space surrounded by the support portion 12 of the holder 10 and the mounting tube portion 31d of the casing portion 30 (casing main body 31). According to this constitution, it is possible to access the second connector 43 by detaching the bolt 12a and pulling out the mounting tube portion 31d from the support portion 12.

In the field device 1 having the foregoing constitution, as illustrated in FIG. 3, the analog signal transfer portion 40 transferring an analog signal is connected to the signal conversion portion 50 in an attachable/detachable manner via the connector 60 in the amplifier shield chamber 30A. For this reason, there is no need to dispose a screw inside the amplifier shield chamber 30A, and thus the amplifier shield chamber 30A can be reduced in size. Therefore, a wider external space of the amplifier shield chamber 30A is realized, and thus a degree of freedom in design outside the amplifier shield chamber 30A is improved.

In this manner, according to the field device 1 of the present embodiment described above, the amplifier shield chamber 30A can be reduced in size by employing a constitution including the casing portion 30 that has the amplifier shield chamber 30A into which the analog signal transfer portion 40 transferring an analog signal output from the piping detector 2 is able to be inserted, the signal conversion portion 50 that is disposed inside the amplifier shield chamber 30A and converts an analog signal into a digital signal, and the connector 60 that is disposed inside the amplifier shield chamber 30A and connects the analog signal transfer portion 40 and the signal conversion portion 50 to each other in an attachable/detachable manner.

In addition, in the present embodiment, as illustrated in FIG. 3, in the amplifier shield chamber 30A, the communication hole 31b1 through which the inside and the outside of the amplifier shield chamber 30A communicate with each other is formed inside the casing portion 30. There are provided the first substrate portion 51 that has the main body portion 51A which is disposed inside the casing portion 30 and outside the amplifier shield chamber 30A, and the insertion portion 51B which extends from the main body portion 51A and is inserted into the amplifier shield chamber 30A through the communication hole 31b1; and the amplifier shielding plate 80 that closes the communication hole 31b1 through which the first substrate portion 51 has passed. According to this constitution, the number of components can be reduced by integrating the substrate portion (insertion portion 51B) disposed inside the amplifier shield chamber 30A and the substrate portion (main body portion 51A) disposed outside the amplifier shield chamber 30A. In addition, shielding properties of the amplifier shield chamber 30A can be maintained by installing the amplifier shielding plate 80 in the communication hole 31b1.

In addition, in the present embodiment, the amplifier shielding plate 80 is screwed to the casing portion 30 together with the first substrate portion 51 outside the amplifier shield chamber 30A. According to this constitution, the first substrate portion 51 and the amplifier shielding plate 80 can be jointly fastened using the bolt 73, and the number of installed bolts outside the amplifier shield chamber 30A can be reduced. Therefore, a degree of freedom in design outside the amplifier shield chamber 30A can be improved.

In addition, in the present embodiment, as illustrated in FIG. 5, the casing portion 30 includes the partition wall portion 31a which faces the plate surface of the insertion portion 51B on one side, and the circumferential wall portion 31b which protrudes from the partition wall portion 31a, which surrounds a part around the insertion portion 51B, and in which the communication hole 31b1 is formed in a part thereof; has the second substrate portion 52 which is placed at the opening end edge of the circumferential wall portion 31b on a side opposite to the partition wall portion 31a, which faces the plate surface of the insertion portion 51B on the other side, and in which the shield pattern 52a is formed; and the amplifier shield chamber 30A is formed by the partition wall portion 31a, the circumferential wall portion 31b, the second substrate portion 52, and the amplifier shielding plate 80. According to this constitution, a small-sized amplifier shield chamber 30A can be formed by combining the second substrate portion 52 and the amplifier shielding plate 80 with the partition wall portion 31a and the circumferential wall portion 31b of the casing portion 30.

In addition, in the present embodiment, as illustrated in FIG. 2, the analog signal transfer portion 40 includes the first part 41 connected to the detection portion 20, the second part 42 inserted into the casing portion 30, and the second connector 43 connecting the first part 41 and the second part 42 to each other in an attachable/detachable manner outside the casing portion 30. According to this constitution, the converter 3 can be detached from the piping detector 2 (holder 10) and the direction of the converter 3 can also be changed without accessing the inside of the converter 3.

Hereinabove, a preferable embodiment of the present invention has been described with reference to the drawings. However, the present invention is not limited to the foregoing embodiment. The shapes, the combinations, and the like of the constituent members illustrated in the embodiment described above are examples and can be variously changed on the basis of requirements of design or the like within a range not departing from the gist of the present invention.

For example, in the foregoing embodiment, a constitution in which the substrate portion (insertion portion 51B) inside the amplifier shield chamber 30A and the substrate portion (main body portion 51A) outside the amplifier shielding plate 80 are integrated has been described. However, the substrate portion inside the amplifier shield chamber 30A may be separated from the substrate portion outside the amplifier shielding plate 80. In this case, the communication hole 31b1 of the circumferential wall portion 31b may not be provided. Namely, the circumferential wall portion 31b may be formed such that the whole circumference of the amplifier shield chamber 30A is covered (surrounded). In this case, the substrate portion (insertion portion 51B) inside the amplifier shield chamber 30A may be fixed to the second substrate portion by being connected thereto or may be fixed using a different fixing means.

In addition, for example, in the foregoing embodiment, the field device 1 in which the casing portion 30 is connected to the piping detector 2 has been described. However, since the analog signal transfer portion 40 can be attached to and detached from the casing portion 30 using the connector 60, the field device 1 need only be constituted to include at least the casing portion 30 and is not limited to a constitution of being connected to the piping detector 2 or other detectors. For example, a pressure transmitter or a temperature transmitter may include the casing portion 30 described above.

(Supplementary Note)

(1) According to an aspect of the present invention, there is provided a field device which may include: a casing portion that has an amplifier shield chamber into which an analog signal transfer portion transferring an analog signal output from a detector is able to be inserted; a signal conversion portion that is disposed inside the amplifier shield chamber, the signal conversion portion being configured to convert the analog signal into a digital signal; and a first connector that is disposed inside the amplifier shield chamber, the first connector being configured to connect the analog signal transfer portion and the signal conversion portion to each other in an attachable/detachable manner.

(2) The field device according to the foregoing (1) may further include: a communication hole through which the inside and the outside of the amplifier shield chamber communicate with each other; a first substrate portion that may include: a main body portion which is disposed inside the casing portion and outside the amplifier shield chamber; and an insertion portion which extends from the main body portion and is inserted into the amplifier shield chamber through the communication hole; and an amplifier shielding plate that closes the communication hole through which the first substrate portion has passed.

(3) In the field device according to the foregoing (2), the amplifier shielding plate may be screwed to the casing portion together with the substrate portion outside the amplifier shield chamber.

(4) In the field device according to the foregoing (2) or (3), the casing portion may include: a partition wall portion which faces a plate surface of the insertion portion on one side, and a circumferential wall portion which protrudes from the partition wall portion and surrounds the insertion portion, the communication hole being formed in a part of the circumferential wall portion, the field device may further include: a second substrate portion which is placed at an opening end edge of the circumferential wall portion on a side opposite to the partition wall portion, the second substrate portion facing a plate surface of the insertion portion on another side, a shield pattern being formed on the second substrate portion, and the amplifier shield chamber is formed by the partition wall portion, the circumferential wall portion, the second substrate portion, and the amplifier shielding plate.

(5) In the field device according to any one of the foregoing (1) to (4), the analog signal transfer portion may include: a second connector configured to connect a first part connected to the detector and a second part inserted into the casing portion to each other outside the casing portion in an attachable/detachable manner.

(6) In the field device according to the foregoing (4), the casing portion may include: a casing main body that is tubular; a first cover mounted on one end side of the casing main body; and a second cover mounted on another end side of the casing main body.

(7) In the field device according to the foregoing (4), the casing main body may be made of a metal, and the first cover and the second cover may be made of resin.

(8) The field device according to the foregoing (4) may further include: a terminal box to which an external wiring introduced through an introduction hole formed in the casing portion is connected, an inside of the casing portion may be separated into an amplifier chamber and a terminal box chamber by the partition wall portion, the first substrate portion and the second substrate portion may be disposed in the amplifier chamber, and the terminal box may be disposed in the terminal box chamber.

(9) In the field device according to the foregoing (4), the main body portion may be connected to the terminal box via a connection terminal penetrating the partition wall portion.

(10) In the field device according to the foregoing (4), a third connector may be provided on the second substrate portion, and the insertion portion may be connected to the analog signal transfer portion via the first connector, and the insertion portion may be connected to the second substrate portion via the third connector inside the amplifier shield chamber.

(11) In the field device according to the foregoing (10), the shield pattern may be formed on an annular part, excluding the first connector, in which at least an opening end of the circumferential wall portion and a tip end portion of the amplifier shielding plate are in contact with each other.

(12) In the field device according to the foregoing (11), the tip end portion may have a length equivalent to a thickness of the circumferential wall portion.

(13) In the field device according to the foregoing (5), a communication hole that communicates with the amplifier shield chamber may be formed in the casing portion, and a connection substrate portion, to which the second connector is connected in an attachable/detachable manner, may be disposed in a lower end opening of the communication hole.

(14) In the field device according to the foregoing (13), the first part may be a flexible sensor lead wire whose one end portion is connected to the detector, and whose another end portion is provided with the second connector and connected to the connection substrate portion.

(15) In the field device according to the foregoing (13), the second part may be a circuit board whose one end portion is connected to the connection substrate portion, and whose another end portion is provided with the first connector and connected to the signal conversion portion.

(16) In the field device according to any one of the foregoing (1) to (15), the detector may include: a piping portion in which fluid flows; and a detection portion configured to measure a flow speed or a flow rate of the fluid.

(17) In the field device according to the foregoing (16), the detection portion may be formed to have a rod shape and inserted into a penetration hole penetrating the piping portion.

(18) In the field device according to the foregoing (17), the detection portion may be disposed inside the piping portion, and a stress detection element that measures the flow speed or the flow rate of the fluid may be provided inside the detection portion.

(19) In the field device according to the foregoing (18), the stress detection element may detect alternate lifting forces acting on a vortex generator of the detection portion, may measure a frequency of Karman vortices, and may measure the flow speed or the flow rate of the fluid from the frequency.

(20) In the field device according to the foregoing (18), a detection signal output from the stress detection element may be transferred to the signal conversion portion via the analog signal transfer portion.

As used herein, the following directional terms "front, back, above, downward, right, left, vertical, horizontal, below, transverse, row and column" as well as any other similar directional terms refer to those instructions of a device equipped with the present invention. Accordingly, these terms, as utilized to describe the present invention should be interpreted relative to a device equipped with the present invention.

The term "configured" is used to describe a component, unit or part of a device includes hardware and/or software that is constructed and/or programmed to carry out the desired function.

Moreover, terms that are expressed as "means-plus-function" in the claims should include any structure that can be utilized to carry out the function of that part of the present invention.

The term "unit" is used to describe a component, unit or part of a hardware and/or software that is constructed and/or programmed to carry out the desired function. Typical examples of the hardware may include, but are not limited to, a device and a circuit.

While preferred embodiments of the present invention have been described and illustrated above, it should be understood that these are examples of the present invention and are not to be considered as limiting. Additions, omissions, substitutions, and other modifications can be made without departing from the scope of the present invention. Accordingly, the present invention is not to be considered as being limited by the foregoing description, and is only limited by the scope of the claims.

What is claimed is:

1. A field device comprising:
   a casing portion that has an amplifier shield chamber into which an analog signal transfer portion transferring an analog signal output from a detector is able to be inserted;
   a signal conversion portion that is disposed inside the amplifier shield chamber, the signal conversion portion being configured to convert the analog signal into a digital signal;
   a first connector that is disposed inside the amplifier shield chamber, the first connector being configured to connect the analog signal transfer portion and the signal conversion portion to each other in an attachable/detachable manner;
   a communication hole through which the inside and the outside of the amplifier shield chamber communicate with each other;
   a first substrate portion that comprises:
      a main body portion which is disposed inside the casing portion and outside the amplifier shield chamber; and
      an insertion portion which extends from the main body portion and is inserted into the amplifier shield chamber through the communication hole; and
   an amplifier shielding plate that closes the communication hole through which the first substrate portion has passed.

2. The field device according to claim 1,
   wherein the amplifier shielding plate is screwed to the casing portion together with the first substrate portion outside the amplifier shield chamber.

3. The field device according to claim 1,
   wherein the casing portion comprises:
      a partition wall portion which faces a plate surface of the insertion portion on one side; and
      a circumferential wall portion which protrudes from the partition wall portion and surrounds the insertion portion, the communication hole being formed in a part of the circumferential wall portion,
   wherein
      a second substrate portion which is placed at an opening end edge of the circumferential wall portion on a side opposite to the partition wall portion, the second substrate portion facing a plate surface of the insertion portion on another side, a shield pattern being formed on the second substrate portion, and
   wherein the amplifier shield chamber is formed by the partition wall portion, the circumferential wall portion, the second substrate portion, and the amplifier shielding plate.

4. The field device according to claim 3,
   wherein the casing portion comprises:
      a casing main body that is tubular;
      a first cover mounted on one end side of the casing main body; and
      a second cover mounted on another end side of the casing main body.

5. The field device according to claim 4,
   wherein the casing main body is made of a metal, and
   wherein the first cover and the second cover are made of resin.

6. The field device according to claim 3, further comprising:
   a terminal box to which an external wiring introduced through an introduction hole formed in the casing portion is connected,
   wherein an inside of the casing portion is separated into an amplifier chamber and a terminal box chamber by the partition wall portion,
   wherein the first substrate portion and the second substrate portion are disposed in the amplifier chamber, and
   wherein the terminal box is disposed in the terminal box chamber.

7. The field device according to claim 3,
   wherein the main body portion is connected to the terminal box via a connection terminal penetrating the partition wall portion.

8. The field device according to claim 3,
   wherein a third connector is provided on the second substrate portion, and
   wherein the insertion portion is connected to the analog signal transfer portion via the first connector, and the insertion portion is connected to the second substrate portion via the third connector inside the amplifier shield chamber.

9. The field device according to claim 8,
   wherein the shield pattern is formed on an annular part, excluding the first connector, in which at least an opening end of the circumferential wall portion and a tip end portion of the amplifier shielding plate are in contact with each other.

10. The field device according to claim 9,
    wherein the tip end portion has a length equivalent to a thickness of the circumferential wall portion.

11. The field device according to claim 1,
    wherein the analog signal transfer portion comprises:
       a second connector configured to connect a first part connected to the detector and a second part inserted into the casing portion to each other outside the casing portion in an attachable/detachable manner.

12. The field device according to claim 1,
    wherein the detector comprises:
       a piping portion in which fluid flows; and
       a detection portion configured to measure a flow speed or a flow rate of the fluid.

13. The field device according to claim 12,
    wherein the detection portion is formed to have a rod shape and inserted into a penetration hole penetrating the piping portion.

14. The field device according to claim 13,
    wherein the detection portion is disposed inside the piping portion, and
    wherein a stress detection element that measures the flow speed or the flow rate of the fluid is provided inside the detection portion.

15. The field device according to claim 14,
    wherein the stress detection element detects alternate lifting forces acting on a vortex generator of the detection portion, measures a frequency of Karman vortices, and measures the flow speed or the flow rate of the fluid from the frequency.

16. The field device according to claim 14,
    wherein a detection signal output from the stress detection element is transferred to the signal conversion portion via the analog signal transfer portion.

17. A field device comprising:
a casing portion that has an amplifier shield chamber into which an analog signal transfer portion transferring an analog signal output from a detector is able to be inserted;
a signal conversion portion that is disposed inside the amplifier shield chamber, the signal conversion portion being configured to convert the analog signal into a digital signal; and
a first connector that is disposed inside the amplifier shield chamber, the first connector being configured to connect the analog signal transfer portion and the signal conversion portion to each other in an attachable/detachable manner,
wherein the analog signal transfer portion comprises:
   a second connector configured to connect a first part connected to the detector and a second part inserted into the casing portion to each other outside the casing portion in an attachable/detachable manner,
wherein a communication hole that communicates with the amplifier shield chamber is formed in the casing portion, and
wherein a connection substrate portion, to which the second connector is connected in an attachable/detachable manner, is disposed in a lower end opening of the communication hole.

18. The field device according to claim 17,
wherein the first part is a flexible sensor lead wire whose one end portion is connected to the detector, and whose another end portion is provided with the second connector and connected to the connection substrate portion.

19. The field device according to claim 17,
wherein the second part is a circuit board whose one end portion is connected to the connection substrate portion, and whose another end portion is provided with the first connector and connected to the signal conversion portion.

* * * * *